3,014,475
CONTROL MECHANISM FOR V-TYPE INTERNAL
COMBUSTION ENGINE
Charles H. Frick, Pontiac, George P. Hanley, Northville, and Frederick Schwartz, Detroit, Mich., assignors to General Motors Corporation, Detroit, Mich., a corporation of Delaware
Filed Mar. 8, 1960, Ser. No. 13,490
6 Claims. (Cl. 123—140)

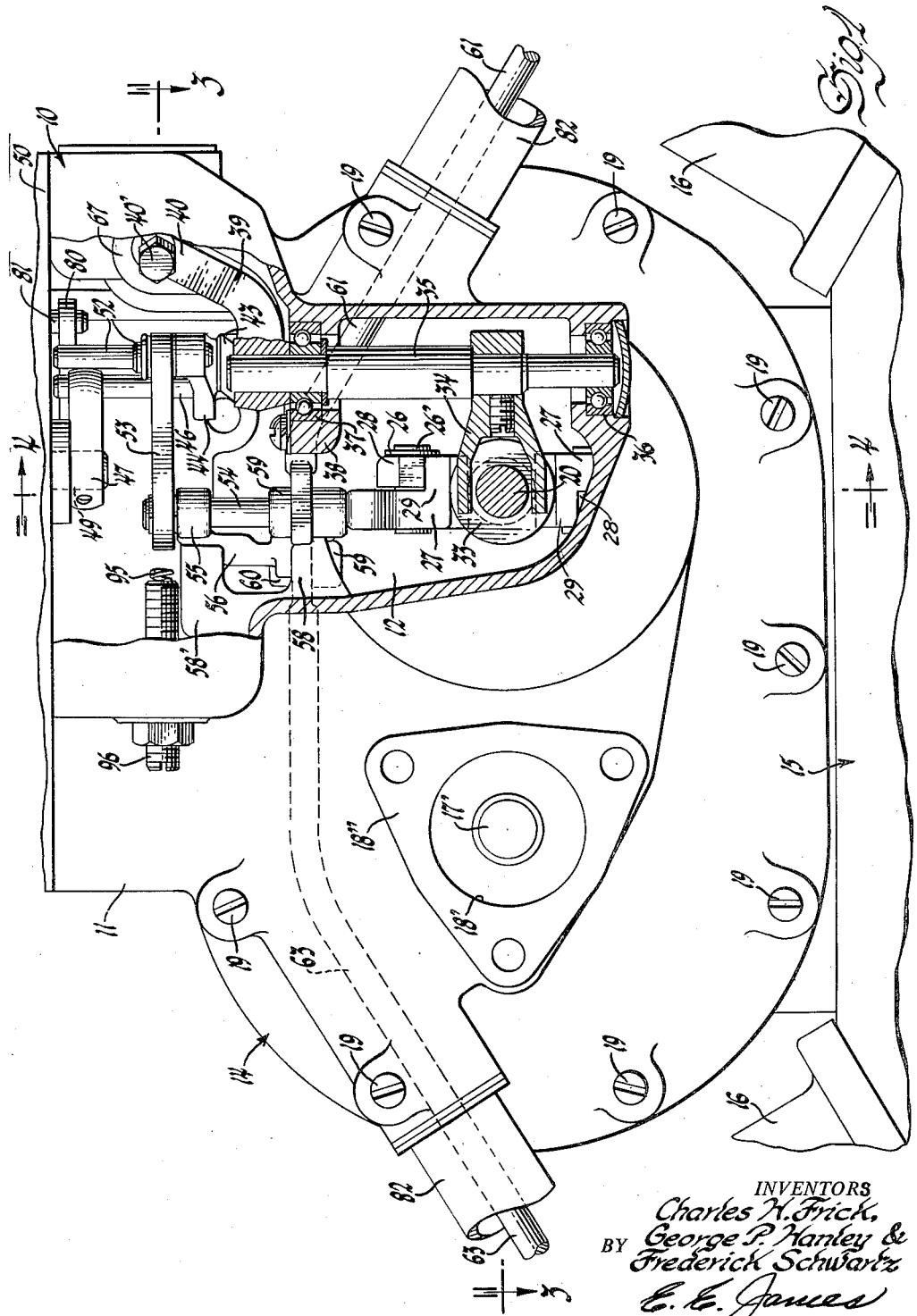

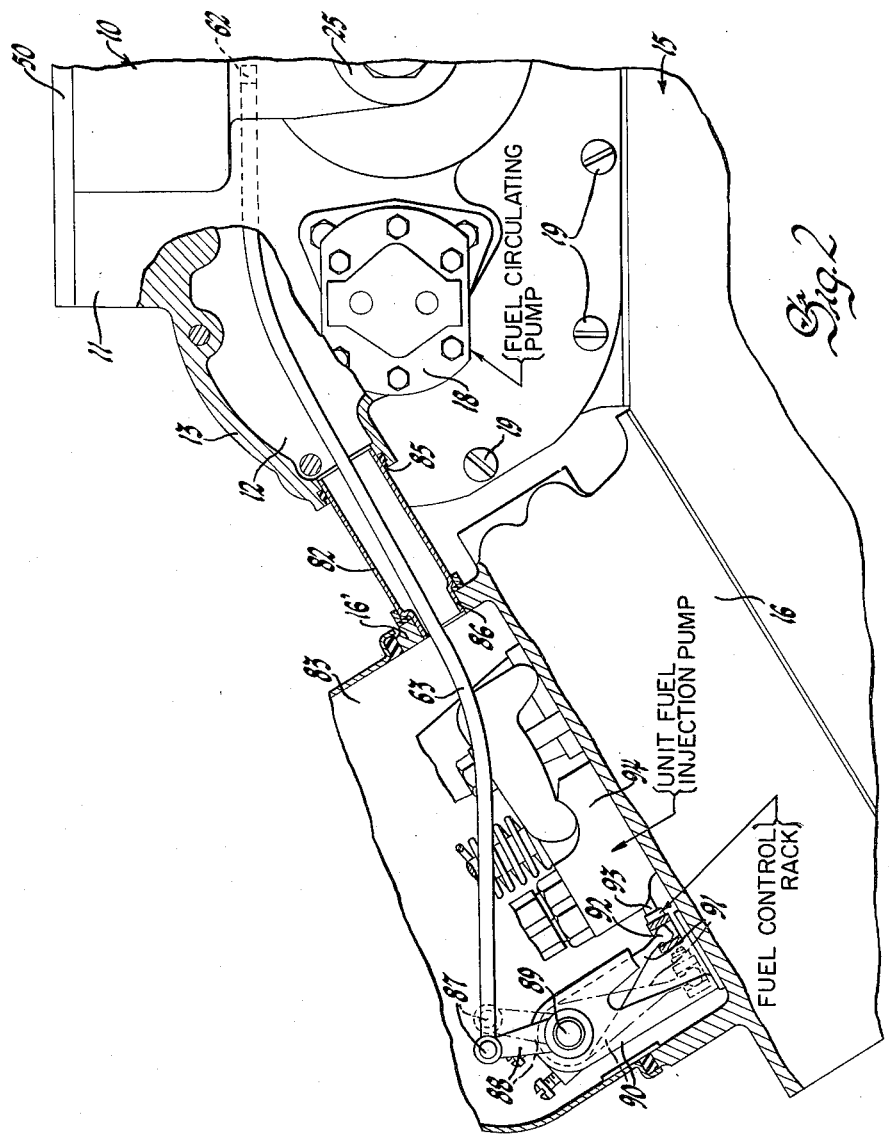

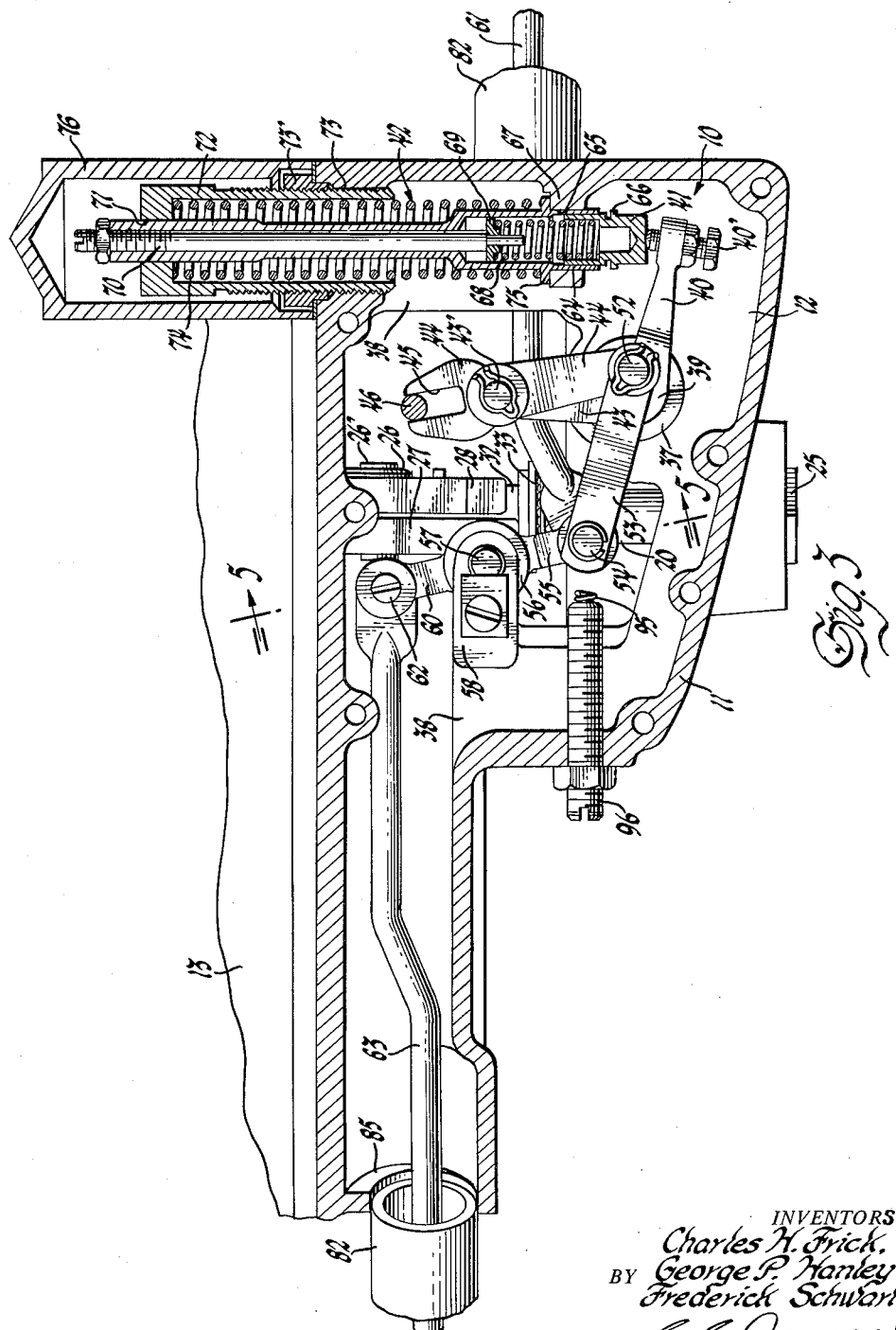

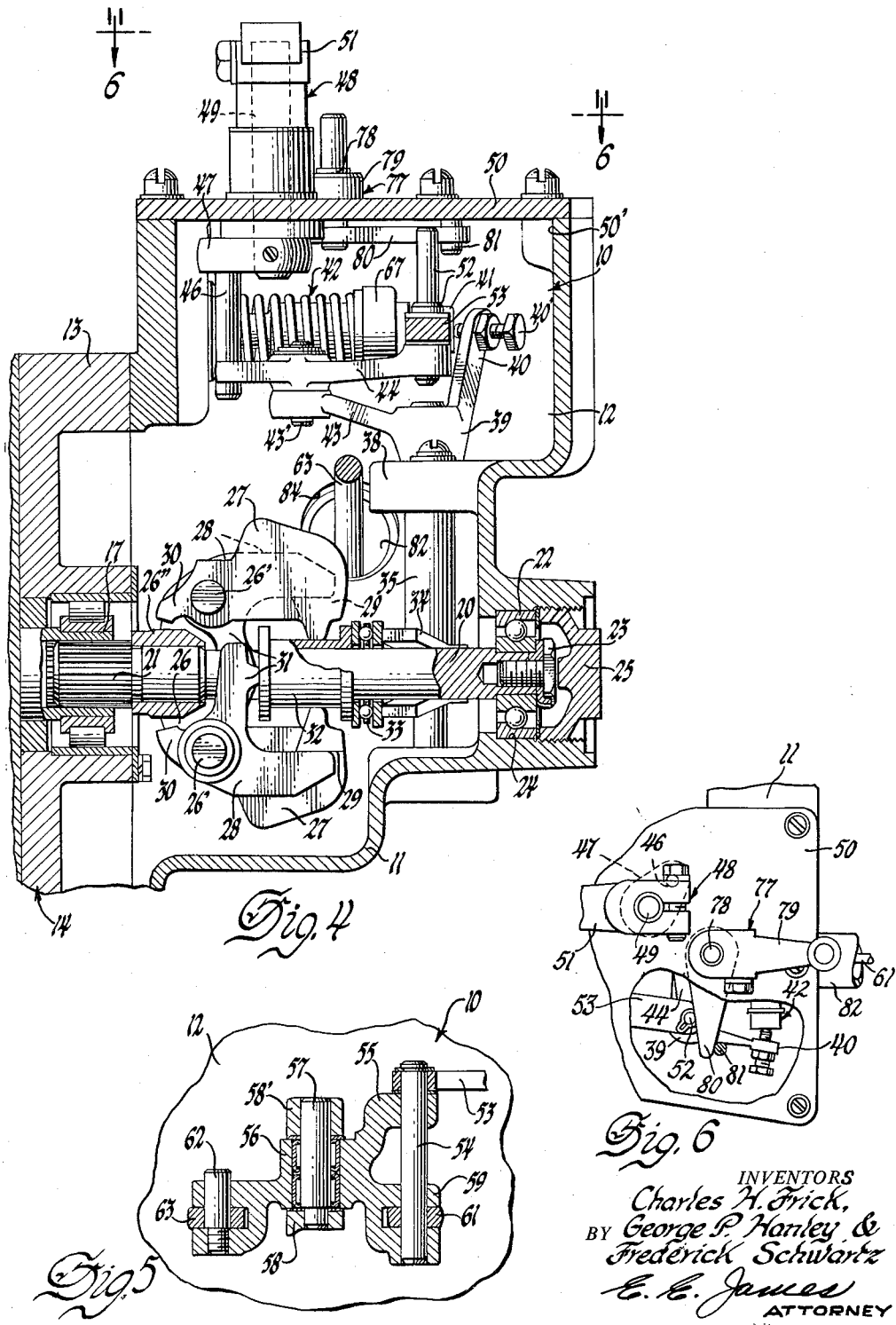

This invention relates to a control mechanism for an internal combustion engine, and more particularly to a fuel and speed control mechanism for a V-type internal combustion engine.

The invention contemplates a fuel and speed control mechanism comprising an engine-driven centrifugal governor mountable on a V-type engine intermediate the V'd cylinder banks and motion equalizing fuel control linkages operatively interconnecting the governor to fuel control mechanisms mounted on the adjacent cylinder heads or otherwise associated with the V'd cylinder banks.

The fuel and speed control mechanism of the invention and the centrifugal governor thereof are particularly adapted for use in a combined engine accessory drive such as shown and described in copending United States patent application Serial No. 2,057, filed January 12, 1960, in the names of William R. Fox and Harvey G. Humphries and entitled "Combined Engine Accessory Drive and Housing Therefore," such a combined accessory drive being particularly adapted for use on a two-cycle uniflow scavenged V-type engine such as shown and described in copending United States patent application Serial No. 1,488, filed January 11, 1960, in the names of Harold H. Albinson, George P. Hanley, Kenneth L. Hulsing, Harvey G. Humphries and John J. May, and entitled "Two-Cycle Internal Combustion Engine."

The foregoing and other objects, advantages and features of the invention will become more apparent from the following description of a preferred illustrative embodiment thereof, reference being made to the several drawings, in which:

FIGURE 1 is a fragmentary front elevational view of a portion of a V-type engine and shows a combined engine accessory drive unit with portions thereof broken away and in section to show certain details of a governor construction illustrative of and embodying the invention;

FIGURE 2 is a second fragmentary view in part complementary to and showing an additional portion of the V engine of FIGURE 1 in front elevation with portions thereof broken away and in section to show the details of the fuel control linkages intermediate the centrifugal governor and the cylinder head mounted fuel control mechanisms;

FIGURE 3 is a sectional view of the centrifugal governor taken substantially on the line 3—3 of FIGURE 1;

FIGURE 4 is a sectional view of the governor taken substantially on the line 4—4 of FIGURE 1;

FIGURE 5 is a fragmentary sectional view taken substantially on the line 5—5 of FIGURE 3 and shows certain details of the motion equalizing linkage; and FIGURE 6 is a fragmentary elevational view taken substantially in the direction of the arrows and in the plane of the line indicated at 6—6 of FIGURE 4 with portions thereof broken away to show certain details of the throttle control and engine shutdown levers.

Referring more particularly to the drawings, a combined blower and accessory drive unit 14 is mounted on a V-type engine 15 intermediate two V'd cylinder heads 16 upon the top deck of the cylinder block. The accessory drive unit includes a positive displacement blower and a centrifugal governor which is indicated generally by the numeral 10. A governor housing member 11 is secured by bolts 19 to a blower end plate member 13 and defines a governor housing chamber 12 therebetween. The end plate 13 defines one end of the blower chamber and journals the adjacent ends of impeller shafts 17 and 17'. The housing member 11 is provided with an opening 18' coaxially spaced from the impeller shaft 17' and has a face 18" finished adjacent thereto. The opening 18' and face 18" mount a gear-type fuel pump 18 which is drivingly connected to the adjacent impeller shaft 17' as shown and described in the aforementioned application Serial No. 2,057. The governor housing member 11 is adapted to house either a limiting speed, variable speed or constant speed centrifugal governor in accordance with the use of interchangeable and alternative flyweight, speeder spring and throttle control lever assemblies. For illustrative purposes, the governor shown in the several drawings and hereinafter described is of a two-speed limiting type.

The limiting speed governor 10 includes a flyweight driving shaft 20. The shaft 20 is drivingly splined to and supported at 21 by the impeller stub shaft 17 and is thus driven by the engine through the blower in fixed ratio to the speed of the engine, e.g. 2:1. The opposite end of the shaft 20 is journaled by a ball bearing 22. The inner race of the ball bearing embraces the end of the shaft 20 and is retained thereon by a bolt 23. The outer race of the bearing is carried by a counterbore 24 in the governor housing member 11 and is retained therein by a closure member 25. A flyweight carrier 26 is secured to the shaft 20 and pivotally mounts low and high speed weights 27 and 28 for centrifugal outward swinging about pivot pins 26'. The low speed weights 27 are of greater mass and have a pickup boss 29. The pickup bosses 29 are adapted to engage and carry the lower mass high speed weights 28 centrifugally outwardly during low speed operation until a pad 30 on each of the low speed weights is brought into abutment with the hub 26" of the weight carrier 26. A lever arm 31 extends radially inwardly of each of the high speed weight members 28 and thrustably engages the adjacent end of a riser sleeve 32 which is slidably mounted on the shaft 20. The opposite end of the riser sleeve 32 thrustably engages a ball bearing 33 which in turn engages the arms of a yolked lever 34.

The lever 34 is secured to governor output or power shaft 35 intermediate its ends, the power shaft being journaled at its lower end by a housing carried ball bearing 36 and adjacent its upper end by a ball bearing 37. The bearing 37 is carried by a web 38 extending horizontally of and integral with the housing member 11. A bell crank lever 39 is secured to the upper end of the shaft 35 and cooperates with the bearing 37 to support the shaft vertically. A first arm 40 of the bell crank lever threadably carries an adjustable nut-locked bolt 40'. The end of the bolt 40' thrustably engages a spring seating cap 41 of a speeder spring assembly 42. A second arm 43 of the bell crank lever 39 carries a pin 43' which pivotally mounts a differential or floating lever 44 intermediate its ends. One end of the differential lever 44 is slotted at 45 to provide a pin and slot connection with a pin 46 carried by one arm 47 of a throttle control lever assembly 48. The lever assembly 48 includes a shaft 49 which is pivotally mounted in and extends through a cover member 50. The cover member is secured to the housing 11 and closes an opening 50' in the upper portion thereof. The lever arm 47 is suitably secured to the lower end of the shaft 49 within the housing compartment 12. A second lever arm 51 is secured to the upper end of the shaft 49 outwardly of the governor housing.

The opposite end of the differential lever 44 carries a pin 52 which provides a pivotal connection with one end of a floating link 53. A pin 54 pivotally connects the opposite end of the link 53 to one arm 55 of a motion equalizing lever 56. The lever 56 is pivotally mounted intermediate its ends by a vertical pivot pin 57. The pin 57 is carried by two vertically spaced bosses 58 and 58' which are formed integrally of and extend from the governor housing boss or web 38. A second arm 59 of the lever 56 is pivotally connected to one end of a fuel control link 61 which is connected at its distal end to the fuel control mechanism associated with the right cylinder head as viewed in FIGURES 1 and 2. The pivotal axes of the lever arms 55 and 59 are co-axial thus permitting the pivot pin 54 to provide the pivotal connections for both the links 53 and 61. A third arm 60 of the equalizer lever 56 is pivotally connected by a pin 62 to one end of a second fuel control link 63 which is connected at its distal end to the fuel control mechanism associated with the left cylinder head. To provide equal fuel controlling movement to the fuel control links 61 and 63, the axes of the pivot pins 54 and 62 carried by the arms of the motion equalizing lever 56 are equidistant with respect to the axis of the lever pivot pin 57 and are disposed on opposite sides thereof in a plane including all three axes.

As best seen in FIGURE 3, the speeder spring assembly 42 normally biases the fuel controlling linkage in an increasing fuel direction in opposition to the fuel decreasing biasing action of the flyweights 27 and 28. The cap 41 is reciprocably mounted in one end of a sleeve member 64 which is of stepped diameter. The cap mounting end of the sleeve member 64 is in turn reciprocably mounted in a cross-head bore 65 extending through a boss 67 formed integrally of the governor housing and upstanding vertically from the housing web 38. The cap 41 is provided with an annular limit boss or shoulder 66 which engages the end of sleeve 64 upon limited movement of the lever 39 by the flyweight mechanism against the biasing action of an idle speed maintaining speeder spring 68. The idle speeder spring 68 is compressively interposed between the cap 41 and a spring seat washer 69. The washer 69 is carried by an elongated adjusting screw 70 which is threadably supported by the distal end of the sleeve 64. The distal end of the sleeve 64 is reciprocably mounted in a bore 71 extending through a cup-shaped spring seat member 72. The spring seat member 72 is threadably adjustable in a tapped opening 73 provided therefor in the blower housing. A locking nut 73' is used to maintain the selected threaded adjustment of the spring seat member 72 relative to the blower housing. A high speed limit maintaining speeder spring 74 is compressively interposed between the closed end of the spring seat member 72 and a spring seating boss 75 formed circumferentially of the sleeve 64. The boss 75 also serves as an abutment stop limiting movement of the sleeve 64 in an increasing fuel direction. A housing member 76 is secured to the main governor housing 11 and encloses the projecting portions of the speeder spring assembly 42.

The fuel control links 61 and 63 extend transversely through openings 84 and 85, respectively, provided therefor in the governor housing 11 and into rocker cover compartments 83 which are defined above the adjacent cylinder heads 16. The fuel control mechanisms mounted on and associated with the left cylinder head is shown in FIGURE 2 and the right cylinder head is provided with corresponding fuel control mechanism. The rocker cover mounting wall 16' is provided with an opening 86 which is in substantial alignment with the governor housing opening 85. The openings 85 and 86 support a housing sleeve member 82 which extends therebetween and spacedly embraces the fuel control link 63. The top opening 50' in the governor housing 11 and the several openings 84, 85 and 86 permit removal of the fuel control links 61 and 63 through the governor housing. Thus the cylinder heads 16 and the governor 10 or the entire combined accessory drive unit 14 can be independently disassembled from the engine for servicing of such components and access to the cylinder block.

Within the left-hand rocker cover compartment 83, the distal end of the link 63 is pivotally connected at 87 to a lever 88. This lever extends upwardly from and is secured adjacent one end of a control tube or shaft 89. The shaft 89 is journaled for rotation about a horizontal axis, as viewed in FIGURE 2, above the cylinder head proper by a plurality of spaced brackets 90. A plurality of levers 91 are secured to the control tube 89 in spaced relation to each other and between the several mounting brackets 90. Each lever 91 is tapered and extends downwardly from its mounting on the control tube to provide a lost motion swivel connection 92 with a fuel control rack 93 of a fuel injector unit 94. The several fuel injector units 94 are of conventional design and adapted to sequentially deliver a fuel charge to their respective cylinders.

Each fuel control rack 93 is reciprocably mounted in the barrel of its respective fuel injector unit and is operable to control the timing and quantity of the fuel charge between a full-fuel supply position shown in full lines in FIGURE 2 and a no-fuel position shown in broken lines. Angular movement of the lever 88 between corresponding extreme fuel control positions is also shown in full and broken lines. This angular movement of the lever 88 is bisected by a vertical plane passing through and including the axis of the control shaft 89. The resultant equiangular movement of the lever 88 with respect to this vertical plane minimizes vertical movement of the pivot 87 and thus minimizes angular cocking of the control link 63 with respect to its pivotal connection 62 to the motion equalizing lever 56. Oscillatory movement of the motion equalizing lever 56 about the vertical pivot 57 occurs between a corresponding full-fuel supply position shown in full lines in FIGURE 3 and a no-fuel position wherein the lever 56 is disposed in substantially parallel relation to the control shafts 89. In the no-fuel position of the lever 56, the end of the link 53 pivotally connected thereto is in compressive abutment with a buffer spring 95 which is carried by a housing mounted stop screw 96. Such limited angular movement of the vertical pivot pins 54 and 62 minimizes angular cocking of the links 61 and 63, respectively, with respect to their horizontal pivotal connections 87 to the control tube levers 88.

This geometrical relationship between the several link and lever elements permits the oscillatory movement of the motion equalizing lever 56 in a horizontal plane about a vertical axis to be translated into oscillatory movement of the levers 88 in a vertical plane about the horizontal axes of the control shafts 89 without binding interference of the several pivotal connections between the fuel control links, the motion equalizing lever and the control shaft levers 88. Such limited cocking of the fuel control links 61 and 63 as occurs with respect to the several pivotal connections is accommodated by the bearing clearances necessarily provided between the several linkage and lever members.

The throttle control lever 48 is normally operable on the fuel control linkage through the differential lever 45 to control the fuel supply and thereby engine speed and torque between the governor controlled idle and maximum limit speeds. Under engine idle conditions with the throttle control lever 45 in a minimum fuel supply control position, an equilibrium condition is obtained between the idle speeder spring 68 and the centrifugal forces acting on the flyweights 27 and 28. Any tendency of the engine to vary from the idle speed limit due to the application or removal of load torque results in a corresponding shifting of the fuel control linkage until a new equilibrium condition is obtained between the flyweights and idle speeder spring thus maintaining the desired idle speed. As the throttle control lever 48 is advanced beyond its minimum fuel supply position, the engine fuel supply and hence speed is increased and the low speed weights 27 are centrifuged radially outwardly into limit abutment with the hub of the flyweight carrier 26. This outward movement of the flyweights 27 results in compressive deflection of the idle speeder spring 68 until the boss 66 of the cap 41 is in abutment with the end of the high speed speeder spring seating sleeve 64. Further movement of the throttle control lever carrying the differential lever 44 in a counterclockwise fuel increasing direction as viewed in FIGURE 3, shifts the fuel control linkage in an increasing fuel direction until the centrifugal forces acting on the high speed weights 28 equals the initial compressive loading of the high speed speeder spring 74. After such an initial equilibrium condition has been achieved, any momentary increase in engine speed due to removal of torque load or further increasing fuel movement of the throttle control lever 48 results in deflection of the speeder spring 74 until a new equilibrium condition between the flyweight and speeder spring biasing forces is achieved with a corresponding counterclockwise rotation of the bell crank lever 39 carrying the fuel control linkage in a decreasing fuel direction thereby limiting the maximum speed of the engine.

A second lever 77 including a pivot shaft 78 is pivotally mounted in and projects through the housing cover member 50. A manually controlled lever arm 79 is secured to the upper end of the pivot shaft 78 outwardly of the governor housing compartment 12. A lower lever arm 80 is secured to the lower end of the pivot shaft 78 within the governor housing and is adapted to engage the upper end of differential lever pivot pin 52 to carry the fuel control linkage to its no-fuel position for engine shutdown upon clockwise rotation of the control lever 77 as viewed from the top of the governor housing. The lever 77 is normally biased to a "fuel supply" permitting position in abutment with a cover mounted stop pin 81 by suitable springs associated with its control linkage, not shown.

From the foregoing, it will be seen that the invention provides a relatively simple and inexpensive fuel and speed control mechanism for a V-type engine including a compact centrifugal governor mountable between the V'd cylinder banks and capable of integration with the combined accessory drive unit and having relatively simple motion equalizing fuel control linkages operatively interconnecting the governor to fuel control mechanisms associated with the adjacent V'd cylinder banks.

While the foregoing description has been limited to one illustrative embodiment, it will be apparent that various changes and modifications might be made therefrom without departing from the spirit and scope of the invention, as defined in the following claims.

We claim:

1. Fuel control mechanism for an internal combustion engine having two inline rows of cylinders disposed in V'd relation about the rotative axis of a common crankshaft and having engine driven accessory means mounted thereon intermediate the cylinder rows, said fuel control mechanism comprising fuel supply means associated with and sequentially operable to supply a measured quantity of fuel to each of the several cylinders, a fuel regulating means associated with the fuel supply means of each inline cylinder row and operable thereon to regulate the quantity of fuel supplied to each of the several cylinders, each of said regulating means including control lever means pivotally mounted for oscillation about an axis extending longitudinally of its associated cylinder row and moveable between no-fuel and full-fuel supply controlling positions, speed responsive centrifugal governor means mounted on said engine intermediate said cylinder rows and drivingly connected to said engine driven accessory for rotation about a longitudinal axis parallel to the axes of said control lever means and said crankshaft, a power output lever mounted for pivotal movement about an axis normal to a plane including the axes of said control lever means and operably connected for speed responsive movement by said centrifugal means, means for biasing said output lever in opposition to said speed responsive centrifugal means, a differential lever pivotally mounted on said power output lever, a first manual means for shifting said differential lever between idle-fuel and full-fuel supply controlling positions, a second manual means for shifting said floating differential lever between its idle-fuel supply controlling position and a no-fuel supply position, a motion equalizing lever mounted for pivotal movement intermediate its ends about an axis extending in parallel spaced relation to the pivot axis of said power output lever, a tie-link pivotally connected to and extending between one arm of the fuel equalizing lever and the floating differential lever, and two links extending transversely of said engine and pivotally connected at adjacent ends thereof to the opposite arms of said motion equalizing lever and pivotally connected at the distal ends thereof to said fuel control lever means.

2. In a fuel control mechanism for an internal combustion engine having two rows of inline cylinders disposed in V'd relation about the rotative axis of a common crankshaft and having engine driven means intermediate the cylinder rows, the combination comprising fuel supply means associated with and sequentially operable to supply a measured quantity of fuel to each of the several cylinders, fuel regulating means associated with each of said fuel supply means and operable thereon to regulate the quantity of fuel supplied to each of the several cylinders, said regulating means including a control lever pivotally mounted on each of said cylinder rows for limited oscillation about an axis extending longitudinally of its associated cylinder row and movable between two extreme fuel supply controlling positions, a motion equalizing lever pivotally mounted on said engine intermediate the cylinder banks for limited oscillation about an axis normal to a plane including the pivotal axes of said control levers, two links extending transversely of said engine and pivotally connected at adjacent ends thereof to opposite arms of said motion equalizing lever and pivotally connected at the distal ends thereof to the fuel control levers, operator controlled linkage means for shifting said motion equalizing lever between two extreme fuel controlling positions, said linkage means including a floating differential lever, and governor means mounted on said engine intermediate said cylinder rows, said governor means including speed responsive centrifugal means drivingly connected to said engine driven means and operably connected to said differential lever to adjust the engine speed, fuel controlling position thereof independently of operator control thereby limiting engine speed.

3. In an internal combustion engine having two longitudinally offset rows of inline cylinders disposed in V'd relation about the rotative axis of a common crankshaft and having engine driven means intermediate the cylinder rows, an engine fuel control mechanism comprising fuel supply means associated with and sequentially operable to supply a measured quantity of fuel to each of the several cylinders, fuel regulating means associated with each of said fuel supply means and operable thereon to regulate the quantity of fuel supplied to each of the several cylinders, said regulating means including two control levers pivotally mounted on said cylinder rows for limited oscillation about spaced parallel axes extending longitudinally of the V'd cylinder rows, said control levers being movable between extreme fuel supply controlling positions and offset corresponding to the longitudinal offset of their respective inline cylinder rows, a motion equalizing lever pivotally mounted on said engine intermediate the cylinder banks for limited oscillation in a plane parallel to the pivotal axes of said control levers, two links extending transversely of said engine and having pivotal connections at adjacent ends thereof with the opposite arms of said motion equalizing lever and having pivotal connections at the distal ends thereof to said fuel control levers, said control and equalizing levers being so disposed that said links are actuated with substantially longitudinal movement thereof between the extreme fuel controlling positions of said control levers, and operator controlled linkage means for shifting said motion equalizing lever between two extreme fuel controlling positions.

4. In the combination set forth in claim 3, said operator controlled linkage means including a floating differential lever and governor means mounted on said engine intermediate said cylinder rows, said governor means including centrifugal means drivingly connectable to said engine for engine speed responsive rotation about an axis parallel to the axes of said control levers and said crankshaft, a power output lever mounted for pivotal movement about an axis extending in parallel spaced relation to the pivot axis of said motion equalizing lever and operably connected for speed responsive movement by said centrifugal means said power output lever pivotally supporting said differential lever intermediate its ends, and means for biasing said output lever in opposition to the speed responsive movement imparted thereto by the centrifugal means thereby limiting engine speed when an equilibrium condition has been achieved between said speed responsive centrifugal means and said biasing means.

5. Fuel control mechanism for a V-type internal combustion engine comprising fuel supply control means associated with and operable to regulate the quantity of fuel sequentially supplied to the several cylinders of each V'd cylinder row, said control means including two lever members pivotally mounted for limited oscillation between no-fuel and full-fuel supply controlling conditions about two parallel axes extending longitudinally of said cylinder rows, a motion equalizing lever pivotally mounted intermediate the cylinder rows for pivotal movement about an axis normal to a plane including the pivotal axes of said control levers, two links extending transversely of said engine and pivotally connected at the adjacent inner ends thereof to the opposite arms of said equalizing lever and pivotally connected at the outer distal ends thereof to the fuel control levers, and operator controlled linkage means for shifting said motion equalizing lever between two extreme positions corresponding to the no-fuel and full-fuel supply controlling position of said control levers, said linkage means including a lever pivotally mounted for movement about an axis extending in parallel spaced relation to the pivot axis of said motion equalizing lever, and a tie-link extending between and pivotally connected at opposite ends thereof to one arm of the motion equalizing lever and to one arm of said operator controlled lever.

6. Fuel control mechanism for an internal combustion engine having two inline rows of cylinders disposed in V'd relation about the rotative axis of a common crankshaft and having engine driven means intermediate the cylinder rows, said fuel control mechanism comprising a governor including a housing mounted on said engine and extending between said cylinder rows, centrifugal means journaled within said housing for rotation about an axis of said crankshaft and drivingly connected to said engine driven means for engine speed responsive rotation thereby, a power output lever pivotally mounted about an axis extending in parallel relation to the longitudinal median plane of the engine including the crankshaft rotative axis, said power output lever being operably connected for speed responsive movement by said centrifugal means, and means for biasing said output lever in opposition to the speed responsive movement imparted thereto by the centrifugal means, a differential lever pivotally mounted intermediate its ends on said power output lever about an axis parallel to the power lever pivot axis, a motion equalizing lever pivotally mounted intermediate its ends within said housing in closely spaced side-by-side relation to said differential lever, the pivotal mounting of said motion equalizing lever being about an axis extending in parallel spaced relation to the pivot axes of said power output and differential levers, a tie-link extending between and pivotally connected at opposite ends thereof to an arm of the floating differential lever and to an adjacent arm of the motion equalizing lever, operator controlled lever means pivotally mounted by said housing and operably connected to shift said differential lever between two extreme fuel supply controlling positions, fuel supply means associated with and sequentially operable to supply a measured quantity of fuel to each of the several cylinders, a fuel regulating means associated with the fuel supply means of each inline cylinder row and operable thereon to regulate the quantity of fuel supplied to each of the several inline cylinders, said fuel supply means and said fuel regulating means by a housing within the engine structure defining each inline cylinder row, and each of said regulating means including a control lever pivotally mounted for oscillation about an axis extending longitudinally of its associated cylinder row and movable between no-fuel and full-fuel supply controlling positions, and two links extending transversely of the engine and pivotally connected at their inner-adjacent ends to opposite arms of said equalizing lever and pivotally connected at their outer distal ends to said fuel regulating lever means.

References Cited in the file of this patent
UNITED STATES PATENTS
2,779,289  Hogeman _____ Jan. 29, 1957